United States Patent [19]

Oppenheimer et al.

[11] Patent Number: 4,832,962

[45] Date of Patent: May 23, 1989

[54] CHEWING GUM AND CONFECTIONERY COMPOSITIONS CONTAINING A SOY FLAVOR ENHANCER

[75] Inventors: Alfred Oppenheimer, Randolph; Michael Glass, Fairlawn; Subraman R. Cherukuri, Towaco, all of N.J.

[73] Assignee: Warner-Lambert Company, Morris Plains, N.J.

[21] Appl. No.: 123,442

[22] Filed: Nov. 20, 1987

Related U.S. Application Data

[63] Continuation of Ser. No. 844,916, Mar. 27, 1986, abandoned.

[51] Int. Cl.⁴ .............................................. A23G 3/30
[52] U.S. Cl. ........................................ 426/3; 426/534
[58] Field of Search ........................................ 426/3–6, 426/534

[56] References Cited

U.S. PATENT DOCUMENTS 3,795,744  3/1974  Ogawa et al. .......................... 426/3
4,248,895  2/1981  Stroz ...................................... 426/3

Primary Examiner—Jeanette Hunter
Attorney, Agent, or Firm—Daniel A. Scola, Jr.; Charles A. Gaglia, Jr.

[57] ABSTRACT

The flavor of chewing gum and confectionery compositions is improved by incorporating into the composition a natural soy flavor enhancer selected from the group consisting of natural soy extract, soy sauce, soy powder, and mixtures thereof in amounts which reduce the bitter or harsh flavor notes perceived after substantial chewing, without imparting the salty taste associated with soy derivatives.

4 Claims, No Drawings

CHEWING GUM AND CONFECTIONERY COMPOSITIONS CONTAINING A SOY FLAVOR ENHANCER

This is a continuation of copending application Ser. No. 844,916 filed on Mar. 27, 1986 now abandoned.

FIELD OF THE INVENTION

This invention relates to chewing gum compositions having incorporated therein a natural soy derivative to overcome the bitterness associated with various flavors after a substantial period of chew. The result is an enchancement of flavor, since bitter off-notes are mitigated or removed.

BACKGROUND OF THE INVENTION

Traditionally, higher amounts of flavor, e.g., 15 to 20 times more, are added to chewing gum compositions than to confectionery compositions such as boiled candy. This is due to the unique problems associated in obtaining satisfactory flavor release during mastication of the chewing gum. The prior art chewing gum compositions traditionally have shown that up to about 90% of the flavor becomes trapped in the gum base portion of the bolus of the gum. The trapped flavor is therefore not available for perception. Yet, after 10 to 15 minutes of chewing, this trapped flavor is known to contribute to a bitter taste in the gum.

One of the primary considerations in developing an acceptable chewing gum composition is a pleasant, uniform flavor which is of long duration and which imparts a good breath freshening attribute. Naturally, bitter tastes are to be avoided. Conventional chewing gum compositions must add flavor in high amounts to account for the substantial percentage of flavor which becomes trapped in the bolus. These higher amounts of flavor, however, produce several problems. First, the flavors may impart an unacceptable and overpowering harshness due to their incorporation in intense amounts. This harshness is sometimes perceived as bitterness. Second, excess flavor results in increased plasticization and softening of the gum base which changes the chew characteristics of the chewing gum. Thus, any advantages obtained by using higher quantities of flavors are offset to a large degree by these problems.

SUMMARY OF THE INVENTION

The instant invention seeks to solve these problems by incorporating a specific amount of a soy flavor enhancer comprising natural soybean extract and derivatives and mixtures thereof into the chewing gum composition. Due to the addition of the flavor enhancer, flavor levels can be added at higher levels than conventional formulations, if desired, without the unpleasant bitterness side effects. Additionally, the advantages that flavors impart, e.g., improved sweetness, improved breath freshening perception, uniform taste characteristics and long lasting flavor perception, can be enjoyed more fully, without the harshness and bitterness normally present after extended chewing, e.g., 15 minutes or more. These advantages becomes particularly relevant in mint flavored gums and gums which contain menthol or cinnamon.

Soybean products are widely used in confectionery products and other foods. Generally, the soy bean is utilized in the form of defatted meal or flour. Its function is primarily as a filler which constitutes low protein as well as bulk. Defatted flours are made by removing the oil from soybean flakes with hexane. The flours are used as is or processed to give concentrates or isolates. Lecithin is added to defatted flour to prepare lecithinated flours useful in controlling the viscosity of a fluid mass, for example, in caramels.

Soy protein isolates prepared by removing both the insoluble and soluble carbohydrates from defatted soy flakes is known to be useful as a thickener or gelling agent. Soy protein concentrates are made by leaching out soluble carbohydrates from defatted flakes. They are often used to supplement the protein, vitamin and mineral content of sweet snack items. The use of these soybean products in confectionery products is disclosed in an article by J. A. Nowacki, 37 Soy Protein in Confectionery Products," *Confectionery Production*, December, 1975.

The September 1981 edition of *Food Engineering* discloses a salty-sweet chewing gum flavor containing soy powder (30% by weight). The soy powder or miso are added as the salting agents. Similarly, Japanese patent application No. 4716671 discloses the use of dried soy sauce to prepare a salty chewing gum. No suggestion in these references is made to flavor enhancement by elimination or reduction of bitterness, nor to the avoidance of saltiness.

DETAILED DESCRIPTION AND PREFERRED EMBODIMENTS

While the exact reason for the contribution of natural soy extract and derivatives thereof towards eliminating or mitigating the bitterness of flavors is not fully understood, it is believed to be related to the amino acid blend present in the soy extract. A synthetic amino acid blend which is capable of reducing the same effect is thus also contemplated.

It must be understood, however, that the inventive compositions should not taste salty, as do most foods, gums and confections containing soy materials. In distinction to the inventive compositions, the chewing gum prior art has conventionally incorporated soy sauce for the specific purpose of effecting a salty taste.

The soy derivatives suitable for use in the practice of this invention include natural soy extract, soy sauce, soy powder and mixtures thereof, present in amounts which eliminate bitter flavor tones and notes without imparting a preceptable salty taste. As used in the specification and claims the term "soy flavor enhancer" means the afore-described soybean derivatives; namely, soy sauce, natural soy extract, soy powder and mixtures thereof. The term encompasses both the water containing derivatives and these components in their dry powder form. The soy sauce is generally a fermented product while the soy extract may be utilized unfermented. The soy flavor enhancer can be utilized in conjunction with the liquid naturally occurring in their preparation, or in their dry powdered form.

The soy flavor enhancer can be added to the gum or confectionery at about 0.2 to about 1.5 wt%, preferably about 0.3 to about 1.0 wt.%, more preferably about 0.4 to about 0.8 wt%, and most preferably about 0.5 to about 0.75%, percents being based on the total chewing gum composition. Amounts greater than 1.5%, e.g., 2.0%, should not be used if a salty taste is to be avoided.

In the practice of this invention the gum base may comprise those natural or synthetic rubbers or elastomers well known in the art. Illustrative, non-limiting examples of gums or elastomers useful as gum bases are natural rubber, chicle, lechi caspi, jelutong, polyisobutylene, isobutylene-isoprene copolymers, styrene-butadiene copolymers and mixtures thereof. The gum base may be present in amount of about 14% to about 50% by weight and preferably about 15% to about 30% by weight based on the total chewing gum composition.

The gum base may, of course, contain elastomer solvents and other materials to aid in softening or extending the elastomer component. Illustrative, non-limiting examples of such materials are the methyl, glycerol or pentaerythritol esters of rosins or modified rosins, such as hydrogenated, dimerized or polymerized rosins or mixtures thereof. Examples of the rosins useful in the preparation of gum bases include the pentaerythritol ester of partially hydrogenated wood or gum rosin, pentaerythritol ester of wood or gum rosin, glycerol ester of partially dimerized rosin, glycerol ester of polymerized wood or gum rosin, glycerol ester of tall oil rosin, glycerol ester of wood or gum rosin and partially hydrogenated wood or gum rosin, as well as partially hydrogenated methyl ester of rosin such as polymers of α-pinene or β-pinene. Terpene resins, including polyterpene and mixtures thereof are also useful. The elastomer solvent can be employed in an amount ranging from about 10% to about 75% by weight of the gum base, and preferably about 45% to about 70% by weight.

Corn syrup can serve as a source of moisture and it can be utilized at about 8% to about 30% by weight, preferably about 15% to about 20% by weight of the chewing gum composition. The specific amount of corn syrup will depend on the overall formulation of the gum composition and may be controlled to provide a conventional moisture content of about 2% to about 8%. As used in the specification and claims the term "corn syrup" includes corn syrup and fructose syrups, as well as other simple syrups.

The chewing gum compositions of this invention will generally include one or more natural or artificial sweetening agents. The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfam-K and the like, and the free acid form of saccharin.

C. Dipeptide based sweeteners such as L-aspartyl-L-phenylalanine methyl ester and materials described in U.S. Pat. No. 3,492,131 and the like.

In general, the amount of sweetener will vary with the desired amount of sweetness desired for a particular chewing gum. This amount will normally be 0.001% to about 90% by weight when using an easily extractable sweetener. The water-soluble sweeteners described in category A above, are preferably used in amounts of about 25% to about 75% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

A variety of conventional ingredients such as plasticizers, softeners and emulsifiers are, of course, useful in the invention. Examples of these materials include: hydrogenated vegetable oil, lanolin, lecithin, stearic acid, sodium stearate, potassium stearate, glyceryl triacetate, glycerine, mono, di-, and tri-glycerides, propylene glycol monostearate, glycerol monostearate, as well as natural waxes, petroleum waxes (such as polyethylene waxes, paraffin waxes and microcrystalline waxes. Mixtures of these materials are also useful in obtaining a variety of desirable textures and consistency properties. These materials are generally employed in amounts of up to 30% by weight and preferably in amounts of about 1% to about 25% by weight, and more preferably about 3% to about 7% by weight of the chewing gum composition.

The chewing gum compositions of this invention can additionally include conventional adjunctives such as coloring agents, flavoring agents, fillers, bulking agents, and mixtures thereof. The coloring agents include titanium dioxide and the well known food dyes of the art. Fillers include, but are not limited to, aluminum hydroxide, alumina, aluminum silicates, calcium carbonate, dicalcium phosphate and mixtures thereof. The use of fillers is optional and they may be used in varying amounts. Preferably, the amount of fillers when used will vary from about 4% to about 30% by weight of the final chewing gum composition.

Flavoring agents well known to the chewing gum art can be added to the chewing gum compositions of this invention. Both synthetic flavoring agents and natural flavoring agents derived from plants, leaves, flowers, fruits, etc. and combinations thereof are useful. These flavoring agents are generally liquids. However, they can also be used as spray dried solids. The use of flavoring agents having other distinct physical forms such as powdered flavorings, beaded flavorings and encapsulated flavorings are within the scope of this invention. Illustrative non-limiting examples of flavoring agents include spearmint oil, cinnamon oil, oil of wintergreen (methylsalicylate) and peppermint oils. Synthetic and natural fruit flavors useful as flavoring agents include such flavorings as citrus oil e.g., lemon, orange, lime and grapefruit; fruit essences including apple, strawberry, cherry, banana, pineapple; and the various flavorings such as aldehydes and esters including cinnamyl acetate, cinnamaldehyde, citral diethyl acetal, dihydrocarvyl acetate, eugenol formate, p-methylanisole, and so forth. Generally any flavoring or food additives such as those described in *Chemicals Used in Food Processing*, pub 1274 by the National Academy of Sciences, pages 49–53 and 63–258 may be used providing the soy extract is able to mitigate the bitterness and harshness of the flavor.

The amount of flavor used will be determined by such factors as flavor type, flavor compatability and the strength desired. In general, amounts of about 0.05% to about 3.0% by weight of the overall chewing gum composition are uses, preferably about 0.3% to about 1.5%, more preferably about 0.7% to about 1.2% by weight.

In general, the process of preparing the inventive chewing gum compositions comprises adding to a suitable gum kettle a melted blend of gum base and corn syrup and mixing until homogenous. Usually a homogeneous mass is obtained in about six (6) minutes at a temperature of about 55° to about 65° C. Sugar, dextrose, malto dextrin and color are usually then blended into the homogeneous mass for approximately two (2) minutes. Flavor is added next and mixed until sufficiently homogeneous.

The soy flavor enhancers can be added directly during the mixing stage of the manufacturing process or incorporated into other flavor ingredients; e.g., spray dried flavor. The soy flavor enhancers can be added directly to the mixing of the gum base; or alternatively, premixed with gum base softeners and then added to the gum base. Additionally, the soy flavor enhancers may be mixed into the chewing gum composition as a final step, along with the liquid flavor.

The soy flavor enhancers have particular application for products incorporating mint or fruit flavors.

The following examples serve to provide further appreciation of the invention but are not meant in any way to restrict the scope of the invention. All percentages throughout the specification and claims are by weight of the overall composition.

EXAMPLE I

A chewing gum composition having the following formulation was prepared as follows:

| Component | Percentage by Weight |
| --- | --- |
| Gum Base | 19.40 |
| Chicle | 1.60 |
| Sugar, Pulverized | 52.25 |
| Corn Syrup | 17.00 |
| Dextrose | 6.00 |
| Glycerin | 0.45 |
| Caramel Color | 0.10 |
| Soy Flavor Enhancer (Powdered soy sauce) | 0.75 |
| Flavor (liquid) (Spearmint) | 0.90 |
| Flavor (spray dried) | 0.50 |
| Maltodextrin | 0.75 |
| Lecithin | 0.30 |

The corn syrup was added to a blending kettle and heated to about 27°–35° C. Melted and filtered chicle, lecithin and gum base at 43° C. were then added to the kettle containing the corn syrup with mixing. Mixing was continued until the ingredients were homogenous (about 2 minutes). Sugar, dextrose, caramel color and maltodextrin were then added and mixing continued until the ingredients were homogenous. The kettle was maintained at about 43° C. throughout the mixing process. With continued mixing the liquid flavor and soy flavor enhancer (soy sauce powoer) were added. The spray dried flavor and glycerin were added in that order with continued mixing to ensure homogeneity.

The mixture was formed into sheets and cooled. The gum had enhanced flavor and sweetness. Furthermore, in chew-out tests the gum evidenced prolonged flavor duration devoid of bitter tones and perceptable saltiness.

EXAMPLE II

A bubble gum was prepared having the following composition:

| Component | Percentage by Weight |
| --- | --- |
| Gum Base | 16.8 |
| Corn Syrup | 22.0 |
| Sugar | 55.7–56.9 |
| Caramel Paste | 2.0 |
| Glycerin | 0.6 |
| Malic or Citric Acid | 0.1% (Range) |
| Liquid Flavor (peppermint) | 0.8 |
| Soy Flavor Enhancer (Natural soy extract) | 0.5–0.75% (Range) |
| FD&C Color (Aluminum Lake) | 0.2 |
| Lecithin | 0.2 |

The gum was prepared in the same manner as Example I except that the ingredients were mixed in the following order:

Melted base, caramel paste, lecithin and corn syrup were added to the kettle at 43° C. After mixing for about 2 minutes the sugar, acid and color were added with continued mixing. Then the liquid flavor, soy flavor enhancer and glycerin were added. Mixing was continued until the blend was homogenous. The gum was formed into sheets and cooled.

Chewing gum panels tested the gum for any perceivable bitterness or saltiness after 15 minutes or more of chew. The inventive gums showed no bitterness or saltiness, but rather a perceivable enhancement of flavor was present.

EXAMPLE III

This example demonstrates the maximum level of the soy flavor exhancer being about 1 5% by weight, beyond which levels a salty flavor is noticeable and flavor enhancement reduced.

A chewing gum composition having the following ingredients was prepared, each composition being nearly identical except for the level of soy flavor enhancer present:

| Ingredient | % by Weight | | |
| --- | --- | --- | --- |
|  | A | B | C |
| Gum Base | 16.80 | 16.80 | 16.80 |
| Sugar | 56.10 | 56.10 | 55.60 |
| Corn Syrup | 22.00 | 22.00 | 22.00 |
| Caramel Paste | 2.00 | 2.00 | 2.00 |
| Flavor (Peppermint) | 0.80 | 0.80 | 0.80 |
| Glycerin | 0.60 | 0.60 | 0.60 |
| Lecithin | 0.20 | 0.20 | 0.20 |
| Soy flavor enhancer | 0.50 | 1.50 | 2.00 |

Each of the above compositions were prepared in the same manner. Melted gum base, caramel paste, lecithin and corn syrup were added to the kettle at about 43° C. After mixing for about 2 minutes, the sugar was added and mixing was continued, at which time the liquid flavor, soy flavor enhancer and glycerin were added. Mixing was continued until the blend was homogeneous.

An expert chew panel was conducted on each of the above compositions. The compositions containing 0.5% and 1.5% soy flavor enhancer (A&B) demonstrated excellent mitigation of bitterness after chewing for an extended period of time (20 minutes or more) without perceptable saltiness. The composition C) containing 2.0% soy flavor enhancer on the other hand exhibited perceptable saltiness and noticeably less flavor enhancement.

EXAMPLE IV

While the soy flavor enhancers of this invention have particular utility in chewing gums, they can be used advantageously in other confectioneries such as boiled candies (e.g. lollypops, lozenges), soft candies (caramel, nougats), pressed tablets (breath mints), cough tablets etc. The following example serves to illustrate the use of the soy flavor enhancer of this invention in boiled hard candies:

| Component | Grams |
|---|---|
| Granulated Sugar | 300.00 |
| Water | 50.00 |
| Corn Syrup | 249.00 |
| Liquid Flavor (cherry) | 1.80 |
| Soy Flavor Enhancer | 1.25 |

The granulated sugar, water and corn syrup were heated to 143° C. With constant stirring. The blenders then cooled to 93° C. and the liquid flavor and soy flavor enhancer with continued stirring. When the flavor was well dispersed the mixture was poured into molds and cooled. The candy exhibited enhanced flavor, as judged by an expert panel when compared with an identical formulation devoid of the soy flavor enhancer.

We claim:

1. A chewing gum composition flavored with an agent capable of producing harsh or bitter tones, said composition being devoid of bitter or harsh flavor tones as a result of having incorporated therein soy sauce in amounts of about 0.2 to about 1.5% by weight, and wherein the soy sauce is in the non-encapsulated form.

2. The chewing gum composition of claim 1 wherein the soy sauce is present in amount of about 0.3% to about 10.0% by weight of the total composition.

3. The chewing gum composition of claim 1 wherein there is included a gum base present in amounts of about 15 to 50%, a sweetener present in amounts of about 0.001 to about 90%, a softener present in amounts up to about 30% and a flavor in amounts of about 0.5 to about 3.0%, by weight of the total composition.

4. The chewing gum composition of claim 3 wherein the flavor is selected from the group consisting of spearmint oil, cinnamon oil, peppermint oil, oil of wintergreen, citrus oils, cinnamyl acetate, cinnamaldehyde, citral diethyl acetal, dihydrocarvyl acetate, eugenol formate, p-methylanisole and mixtures thereof.

* * * * *